(12) United States Patent
Blomqvist et al.

(10) Patent No.: US 7,305,244 B2
(45) Date of Patent: Dec. 4, 2007

(54) METHOD FOR ACTIVATING A LOCATION-BASED FUNCTION, A SYSTEM AND A DEVICE

(75) Inventors: Mikko Blomqvist, Tampere (FI); Tommi Laine, Tampere (FI)

(73) Assignee: Nokia Corporation, Espoo (FI)

( * ) Notice: Subject to any disclaimer, the term of this patent is extended or adjusted under 35 U.S.C. 154(b) by 99 days.

(21) Appl. No.: 10/762,589

(22) Filed: Jan. 21, 2004

(65) Prior Publication Data
US 2004/0180674 A1    Sep. 16, 2004

(30) Foreign Application Priority Data
Jan. 21, 2003    (FI)    .................................. 20030090

(51) Int. Cl.
*H04Q 7/20*    (2006.01)
(52) U.S. Cl. ................................ 455/456.5; 455/414.1; 455/414.2; 455/456.1; 455/456.2; 455/456.3; 455/457; 455/466; 701/207; 701/213; 701/214; 701/216; 342/357.01; 342/357.06; 342/357.12
(58) Field of Classification Search ............ 455/414.1, 455/414.2, 456.1–457, 466; 701/207, 213, 701/214, 216; 342/357.01, 357.06, 357.12
See application file for complete search history.

(56) References Cited

U.S. PATENT DOCUMENTS

| | | | |
|---|---|---|---|
| 5,963,861 A * | 10/1999 | Hanson | .................. 455/456.1 |
| 5,982,324 A * | 11/1999 | Watters et al. | ......... 342/357.06 |
| 6,014,090 A * | 1/2000 | Rosen et al. | ................. 340/905 |
| 6,061,561 A * | 5/2000 | Alanara et al. | .......... 455/456.1 |
| 6,108,533 A * | 8/2000 | Brohoff | .................... 455/414.3 |
| 6,351,647 B1 * | 2/2002 | Gustafsson | ................ 455/466 |
| 6,424,840 B1 * | 7/2002 | Fitch et al. | .............. 455/456.1 |
| 6,477,363 B1 * | 11/2002 | Ayoub et al. | ............. 455/404.2 |
| 6,496,776 B1 * | 12/2002 | Blumberg et al. | .......... 701/213 |
| 6,571,279 B1 * | 5/2003 | Herz et al. | ................... 709/217 |
| 6,580,914 B1 * | 6/2003 | Smith | ....................... 455/456.6 |
| 6,728,528 B1 * | 4/2004 | Loke | .......................... 455/318 |
| 6,731,612 B1 * | 5/2004 | Koss | .......................... 370/310 |
| 6,772,213 B2 * | 8/2004 | Glorikian | .................... 709/228 |
| 6,789,102 B2 * | 9/2004 | Gotou et al. | ................ 709/203 |
| 6,798,358 B2 * | 9/2004 | Joyce et al. | ........... 340/995.24 |

(Continued)

FOREIGN PATENT DOCUMENTS

EP    1045609    10/2000

(Continued)

*Primary Examiner*—Steve M. D'Agosta
(74) *Attorney, Agent, or Firm*—Ware, Fressola, Van Der Sluys & Adolphson

(57) ABSTRACT

A method for activating a location-based function, at least one item of position data is determined for the function as a condition for activating the function. A device in a wireless communication network examines at least one property of the network to decide whether positioning of the device (1) is conducted. Likewise, a system may provide a location-based function, for which at least one item of position data is determined as a condition for activating the function. A program in which the method is applied is also provided.

9 Claims, 4 Drawing Sheets

U.S. PATENT DOCUMENTS

| | | |
|---|---|---|
| 6,922,567 B1 * | 7/2005 | Rydbeck .................. 455/456.3 |
| 6,944,465 B2 * | 9/2005 | Spain et al. ............. 455/456.1 |
| 6,957,076 B2 * | 10/2005 | Hunzinger ............... 455/456.3 |
| 6,970,871 B1 * | 11/2005 | Rayburn ...................... 707/10 |
| 6,993,326 B2 * | 1/2006 | Link et al. ............... 455/414.1 |
| 7,035,647 B2 * | 4/2006 | de Verteuil ............. 455/456.1 |
| 7,050,816 B2 * | 5/2006 | Fukui et al. ............. 455/456.1 |
| 7,107,038 B2 * | 9/2006 | Fitch et al. .............. 455/404.2 |
| 2002/0164999 A1 * | 11/2002 | Johnson ...................... 455/456 |
| 2003/0119530 A1 * | 6/2003 | Rankin ....................... 455/456 |
| 2004/0008138 A1 * | 1/2004 | Hockley et al. ....... 342/357.09 |

FOREIGN PATENT DOCUMENTS

| | | |
|---|---|---|
| EP | 1189474 | 3/2002 |
| WO | 0113662 | 2/2001 |
| WO | 0137601 | 5/2001 |
| WO | 0217654 | 2/2002 |
| WO | 03045100 | 5/2003 |
| WO | 03096735 | 11/2003 |

* cited by examiner

METHOD FOR ACTIVATING A LOCATION-BASED FUNCTION, A SYSTEM AND A DEVICE

CROSS-REFERENCE TO RELATED APPLICATIONS

This application claims priority under 35 USC §119 to Finnish Patent Application No. 20030090 filed on Jan. 21, 2003.

FIELD OF THE INVENTION

The present invention relates to a method for activating a location-based function, in which at least one item of position data is determined for the function as a condition for activating the function, the device being used in a wireless communication network in which signals are transmitted. The invention also relates to a system comprising determination means for determining a location-based function, in which at least one item of position data is determined for the function as a condition for activating the function, processing means for activating the location-based function in a device, and a wireless communication network comprising at least one transmitter for transmission of signals. Moreover, the invention relates to a device comprising determination means for determining a location-based function, in which at least one item of position data is determined for the function as a condition for activating the function, processing means for activating the location-based function in a device, and wireless communication means for setting up a data network connection to a wireless communication network. The invention also relates to a program containing a group of machine-executable program commands for presenting messages in a device, and at least one location-based condition for presenting the message is determined in the message, said program being intended to be executed in a device used in a communication network in which signals are transmitted.

BACKGROUND OF THE INVENTION

Several applications have been developed that contain a location-based condition determined for a message for the presentation of the message. Such messages are for example regional advertisements that can be transmitted to a device carried by the user, and when the user arrives to a certain location, for example in the vicinity of a store, a restaurant, a service station, or the like, this is indicated in the device of the user. The person in question may have determined conditions for presenting different messages in his or her device, wherein when he or she approaches a location in relation to which he or she has determined a message to be presented, said message is presented in the device. The person may determine for example a reminder to visit a certain hardware store, wherein when the user approaches said hardware store, this is indicated in the device of the user.

To enable the above-presented arrangements, positioning must be conducted in the device at intervals so that the location of the device is known also when the user is moving. In solutions of related art, positioning must be conducted relatively often, several times a minute, or even tens of times a minute, so that the positioning is sufficiently accurate and occurs in real time. Typically positioning is conducted by means of a positioning receiver arranged for this purpose, said receiver determining its location on the basis of the signals transmitted by the satellites of the positioning system. Positioning systems that can be mentioned in this context are for example the GPS system and the GLONASS system. Applications have also been developed in which the positioning is conducted for example by means of the base stations of a mobile communication network, or a wireless local area network. In some cases the mobile communication network performs the positioning of the device and transmits information thereon to the device.

One of the drawbacks in such continuous positioning is for example that it increases the power consumption of the device, which, especially in portable devices, can restrict the availability of positioning and shorten the operating time of the device. Furthermore, especially the positioning information obtained from the mobile communication system may be subject to charge, wherein positioning may be expensive.

SUMMARY OF THE INVENTION

It is an aim of the present invention to provide an improved method and system for performing location-based functions (for example presenting messages) in a device. The invention is based on the idea that at least one property of a wireless communication network is monitored, wherein a change in at least one property of the monitored wireless communication network is used as a condition for performing the positioning. In a solution according to a first preferred embodiment of the invention, the positioning is always performed when it is detected that the device has moved to the area of another cell. This can be detected on the basis of the changes in the cell identifier. In the solution according to a second preferred embodiment of the invention, one or several cell identifiers are determined, wherein when the device enters the area of such a cell, positioning is performed. In a method according to yet another preferred embodiment of the invention, at least one property, such as signal strength and/or timing of a signal transmitted in a wireless communication network is monitored, wherein a change in the monitored property either as such or together with the cell identifier, determines whether positioning is conducted or not. To put it more precisely, the method according to the present invention is primarily characterized in that at least one property of a wireless communication network is monitored in the device to decide whether positioning of the device is conducted. The system according to the present invention is primarily characterized in that the device comprises monitoring means for monitoring at least one property of a wireless communication network, and determination means in which the property to be monitored is arranged to be used to decide whether positioning of the device is conducted. The device according to the present invention is primarily characterized in that the device comprises monitoring means for monitoring at least one property of a wireless communication network, and determination means in which the property to be monitored is arranged to be used to decide whether positioning of the device is conducted. Furthermore, the program according to the present invention is primarily characterized in that the program also comprises machine-executable program commands for monitoring at least one property of a wireless communication network to decide whether positioning of the device is conducted.

The present invention shows remarkable advantages over solutions of prior art. When the method according to the invention is applied, it is not necessary to perform the positioning as often as in solutions of the prior art, because the criterion for performing the positioning is relatively reliable information based on the fact that the user has indeed moved from a previous location to another location. Thus the total power consumption of the device can be reduced. The reduced need to perform positioning reduces the loading of the processor of the device, wherein more capacity is available for use for the needs of other applications. Furthermore, if the positioning utilized in the device is based on the use of a service that is subject to charge, savings in the positioning costs are attained by means of the method according to the invention. When applied in network-assisted systems, it is also possible to reduce the loading of the network by means of the invention.

Another advantage attained by means of the method according to a first preferred embodiment of the invention is that the positioning is more reliable because the dependency of the positioning on the network is less significant than in situations where solutions of the prior art are applied. The reason for this is that the positioning is performed primarily in the device itself.

When the method according to the second preferred embodiment of the invention is applied, it is not necessary to show the cell identifier in the device for the user or for the application that has requested for a location-based reminder. Thus, it is possible to apply the method also in connection with such networks in which it is desired to conceal the cell identifier.

DESCRIPTION OF THE DRAWINGS

In the following, the invention will be described in more detail with reference to the appended drawings, in which.

DETAILED DESCRIPTION OF THE INVENTION

Figure 1A:
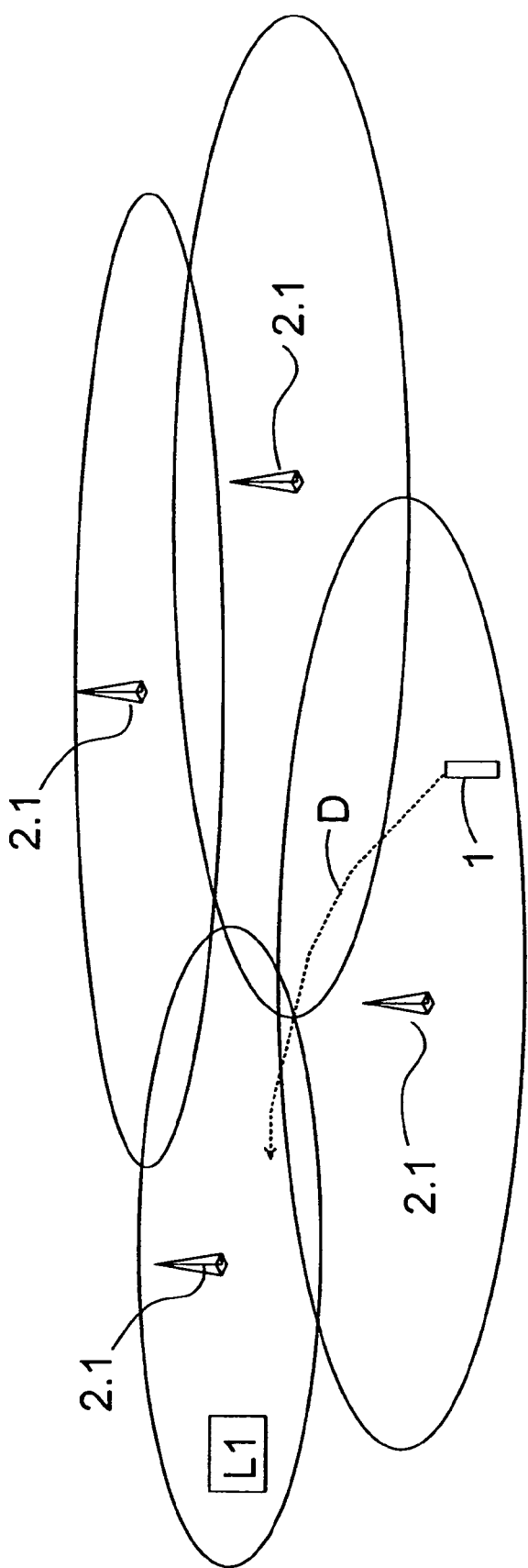
FIG. 1a shows an exemplary situation, in which the method is applied.
Figure 1B:
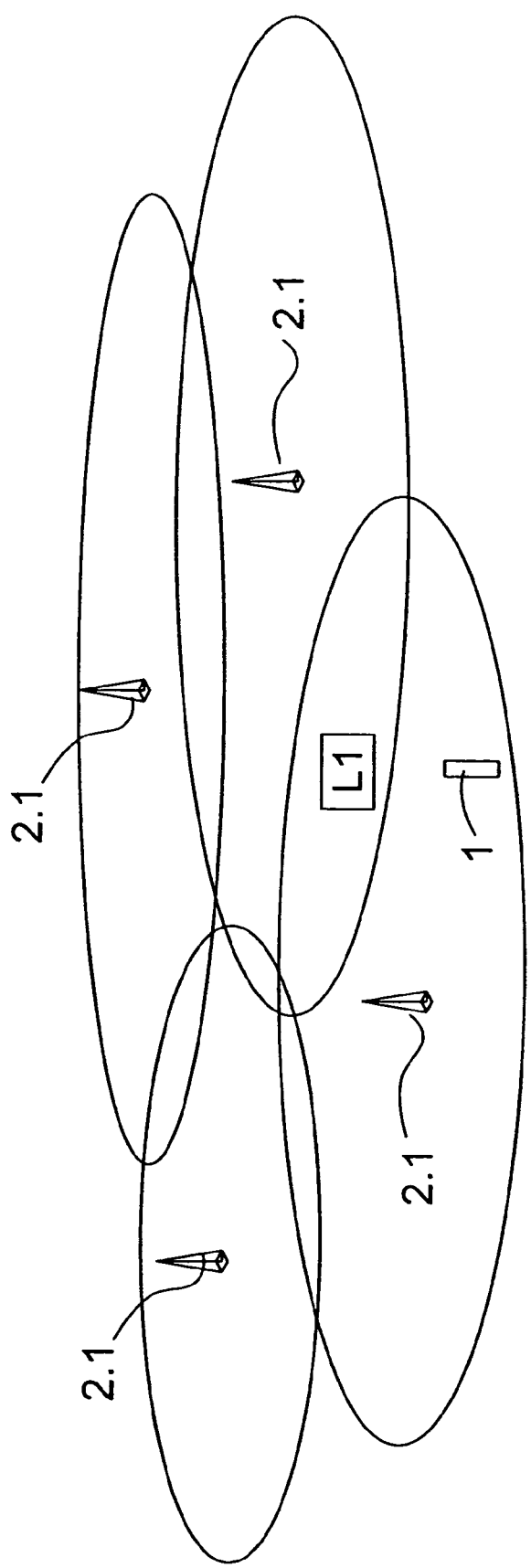
FIG. 1b shows another exemplary situation, in which the method is applied.
Figure 3:
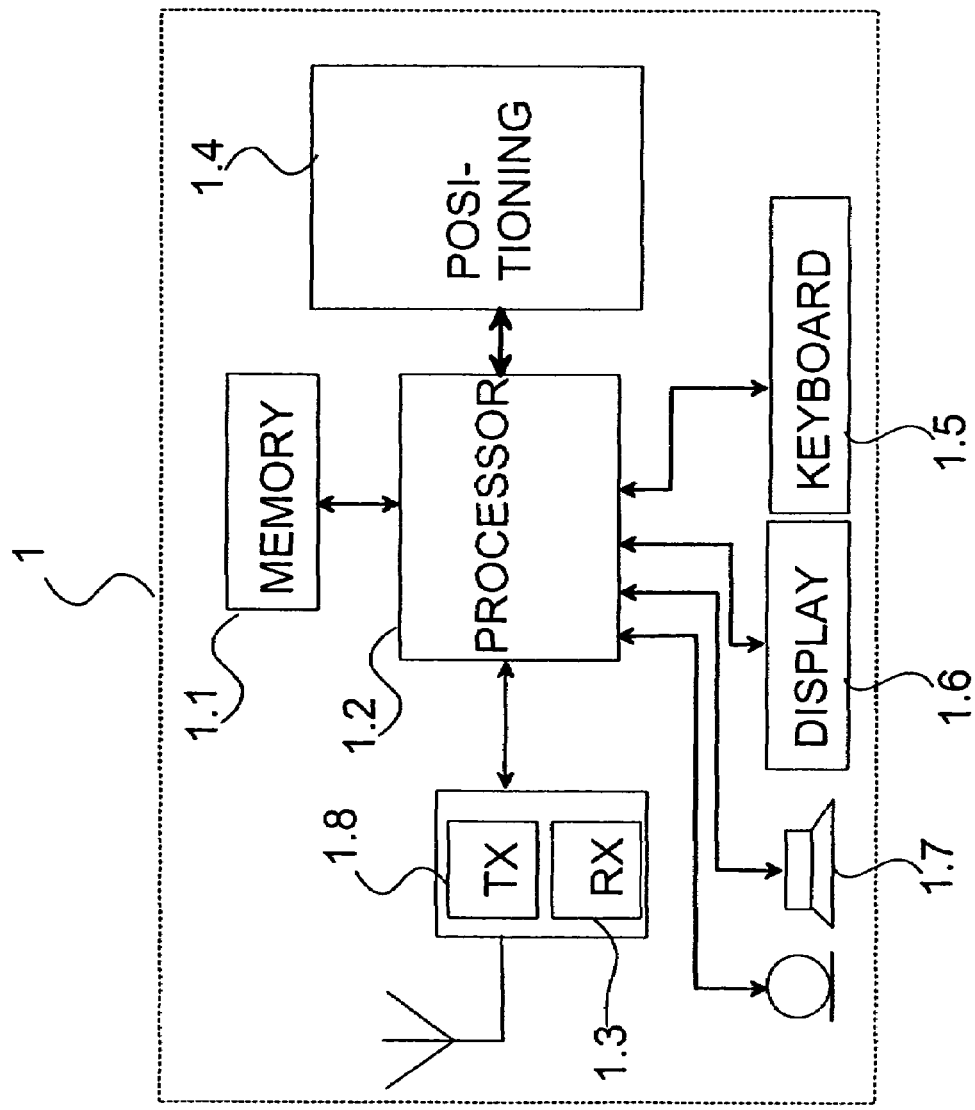
FIG. 3 shows a device according to a preferred embodiment of the invention in a simplified block diagram.

In the exemplary situation of FIG. 1a, the user has determined a location-based function, such as a reminder in a device 1 for example by means of a keyboard 1.5 (FIG. 3). The function can be for example a picture message, a text message, a sound message or a combination of these, starting of a program or a service in the device 1, or a corresponding function. The determination of the function contains for example coordinate information or the like by means of which the position data activating the function can be determined with sufficient accuracy. The position data can also contain information for example on the radius, wherein when the user arrives in the area determined by the coordinates and the radius, a predetermined function is performed, for example a message relating to the reminder is presented in the device 1. In FIGS. 1a and 1b, the reference numeral L1 represents one example location to which the location-based function relates. The information on the function is advantageously stored in the memory 1.1. of the device 1 (FIG. 3), but the invention can also be applied in such a manner that at least part of the information relating to the function is stored in the communication network 2.

The ellipses drawn around the base stations 2.1 illustrate the operating range of the base stations, i.e. a so-called cell. It is, however, evident that in practice the size and shape of the operating range is not regular, but varies for example as a result of weather conditions, the shape of the terrain, radiation patterns of the antennas and other environmental factors.

In FIG. 1, a broken line D also illustrates as an example the possible travel path of user of the device 1 towards the target L1.

Figure 2:
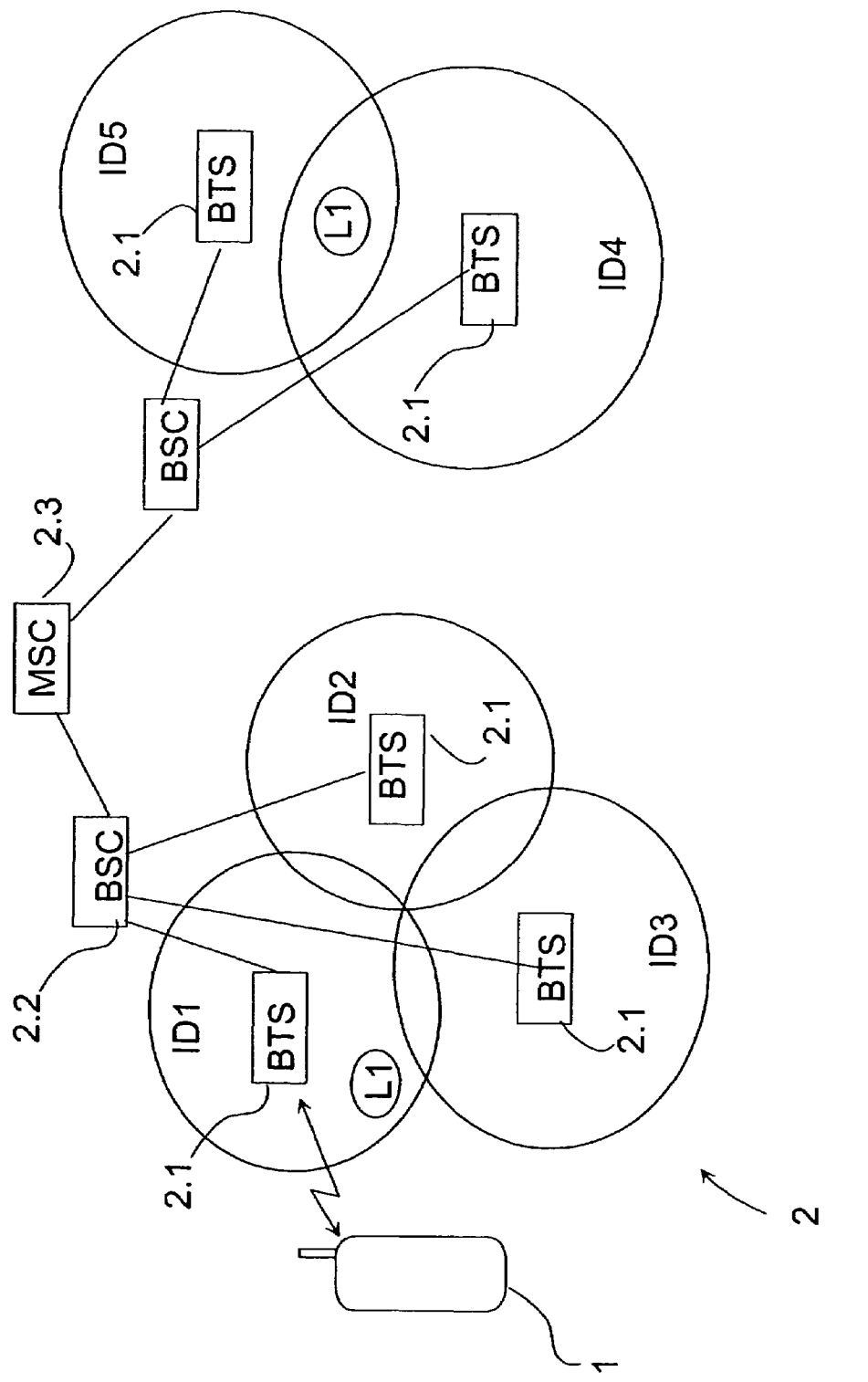
FIG. 2 shows a system according to a preferred embodiment of the invention in a simplified block diagram.

Let us assume that in the system according to FIG. 2, the device is logged in, i.e. communicating with the communication network 2, such as a mobile communication network via one or several base stations 2.1. The base stations, in turn, are connected to a base station switching centre 2.2 or the like. In the system according to FIG. 1a, the base station switching centres are connected to a network centre, 2.3, such as a mobile station switching centre. Although in this description a mobile station switching centre is used as an example of the communication network 2, it should be evident that the invention can also be applied in connection with other wireless communication networks, such as wireless local area networks (not shown).

It is well known that base stations 2.1 are used in wireless local area networks, via which base stations the networks are connected to the terminals moving in the area of the network, such as mobile phones or portable computers equipped with a transmitter/receiver of the wireless local area network. Such base stations 2.1 are also called serving base stations. For each base station 2.1 an identifier (ID) is determined. The area determined by the radius of operation of one base station is also called a cell, wherein the term cell identifier is in the description hereinbelow used for this base station identifier. In the example system of FIG. 2, different cell identifiers are marked with ID1-ID5, but in practice, the different presentation modes of the identifiers can be different in different applications.

During the function of the device 1 for example the processor 1.2 of the device executes a program in which the method according to the present invention is applied. In the program, at least one property of the wireless communication network and changes in the same are monitored. In the following, cell identifiers and changes in them are used as a non-restrictive example of such a property. This can be advantageously implemented in such a manner that signals transmitted by the serving base station 2.1 are received by the receiver 1.3, and the information transmitted in the signal is presented. This information contains the cell identifier, which is thus transmitted to the program executed in the processor. Thus, the program compares the cell identifier according to the previously stored serving base station with the cell identifier of the currently received cell identifier. If they match, it can be determined that the cell has not changed, and it is not necessary to conduct positioning. However, in such a situation where the cell identifier has changed, positioning is started. Thus, the processor 1.2 activates a positioning receiver 1.4 in connection with the device 1. This positioning receiver 1.4 is for example a positioning receiver according to the GPS positioning system known as such. The operation of such a positioning receiver is of prior art known by anyone skilled in the art, wherein it is not necessary to discuss it in more detail in this context.

It is, however, possible to perform the positioning by means of another method, for example by means of a base station based positioning method. Thus, a signal transmitted by three or several base stations 2.1 is received in the device 1, and on the basis of the differences in the mutual reception times of the signals and the known location coordinate information of the base stations 2.1 it is possible to perform a calculation to determine the location of the device 1 in a manner known as such. The base station based positioning can also be conducted in the communication network in such a manner that a signal transmitted by a transmitter 1.8 of the device 1 is received by at least three base stations 2.1. Also in this situation the location of the device 1 can be calculated by means of the reception times of the signal at different base stations and the known location coordinate information of the base stations.

After the location of the device 1 has been determined, it is examined whether the device 1 is in the vicinity of a location complying with a stored function performance condition. This is implemented in the device 1 advantageously in such a manner that the location coordinates and possible distance information, such as the radius, are examined in the function information stored in the memory 1.1. If the determined location is in the area determined by a performance condition of the function, the necessary measures are taken to perform the function. This can be advantageously implemented in such a manner that a so-called reminder service library implementing the reminder service as well as an application that utilizes the reminder service library to perform a function, for example to present a reminder in text format for the user are established in the device 1. Thus, the application calls for such a function in the reminder service library by means of which the application can determine the location in which the reminder service library will provide the application with information on the arrival in the determined location. When the application has received information on the arrival in the determined location, the application implements the determined function, for example presents a message in text format. Thus, said text is formed on the display 1.6. Similarly, if the message in question is another visual message, this message is formed on the display 1.6. Furthermore, if the message in question is a sound message, this sound message is transmitted to a speaker/earpiece 1.7.

It is also possible to determine acknowledgement data for the message, or data on the display time of the message and possibly also data on the repetition interval of the message. Thus, the visual message remains on the display 1.6 until the user acknowledges it or the display time expires. The audio message, in turn, is repeated advantageously at intervals determined by the repetition interval, until the user acknowledges the message or the display time expires.

Other functions to be mentioned in this context that can be activated on the basis of the location are starting of a program, changing the settings of a device, for example changing the user profile in a mobile station, re-configuration, or a security function. The user for example wishes to silence his or her mobile station when arriving to a certain location, turn off the mobile station for example when arriving to an airport, etc. It should be evident that the afore-described details only represent some possible examples, but the invention can also be applied in implementing numerous other functions on the basis of the location. Furthermore, the invention can be applied to implement various services. Non-restrictive examples that can be mentioned in this context are informative services and security services.

By means of the invention it is possible to implement for example such an informative service in which a person wishes to receive a message when his or her acquaintance has arrived to a certain location, for example his or her home. Thus, the person utilizes his or her device (not shown) to transmit a function determination to the device 1 of his or her acquaintance, in which the device of the acquaintance is requested to transmit information on the arrival of the device 1 to a predetermined location. When the device 1 has received the function determination, it starts executing the method according to the invention to activate a location-based function. Thus, when the device 1 arrives to a determined location, the device 1 transmits information thereon to the device of said person, in which the arrival of the monitored device to the predetermined location is indicated.

An example of a security service that can be mentioned is the monitoring of the movement of a person. Thus, the person carries a device 1 according to a preferred embodiment of the present invention in which the position conditions of the location-based functions are monitored in the manner presented in this description. When said person arrives to a certain location or leaves a predetermined location or area, information thereon is transmitted from the device of the person to the monitoring device. Thus, a function, such as an alarm is activated in the monitoring device to give information on the movement of the person that is being monitored. Companies providing guarding services, and transportation services of valuable goods can also apply the present invention for example in monitoring the movement of guards and transportations of valuable goods for example in the following manner. The device according to the invention accompanies the guard or the transportation of valuable goods, and one or several location-based functions are determined in the device. Such a function is for example sending a message to the monitoring device in predetermined locations. Thus, the arrival of the monitored device is detected by the monitoring device. Furthermore, it is possible to determine information indicating how long it will probably take to move from one location to another, wherein the delaying of a location-based message can be an indication that the movement of a guard or a transportation of valuable goods has not proceeded normally, and it is possible to start the necessary actions to determine the situation, for example to call help to the estimated problem location.

FIG. 1*b* shows another example situation in which the method according to a preferred embodiment of the invention is applied. Also in this situation, position data is determined in the location-based function. Advantageously at least this position data is transmitted to the communication network 2, in which it is determined (for example in a network centre 2.3) in the area of which cell or cells this location is situated. Information on the identifiers of such a cell or cells is transmitted to the device 1, in which the information is stored into the memory 1.1 for example into the information of said location-based function. In the device 1, the changing of the cell identifier is monitored as disclosed hereinabove in connection with the description of the method according to the first embodiment of the invention. At that stage when the serving base station changes, i.e. the cell identifier changes, the device 1 examines the information on the location-based functions on the basis of the new cell identifier. If one or several cell identifiers that have been determined for a location-based function match with the cell identifier of the new serving base station, i.e. the device 1 is probably in the vicinity of such a location in which the execution of a location-based function is determined, positioning is conducted. At that stage when the positioning shows that the device 1 is in the area determined for said location-based function, said location-based function is conducted.

In the above-presented preferred embodiments of the invention, it is necessary for the device 1 to perform positioning and to examine the realization of the performance condition of the function only when the cell identifier changes. In the method according to yet another embodiment of the invention, steps are taken that differ slightly from the process described above, the basic idea, however, relating to the examination of the changes in the cell identifier. In this embodiment, positioning is repeated at intervals at that stage when the device 1 has arrived sufficiently close to the determined location or in the area of such a cell in which the location is situated. If this embodiment is applied in connection with the first preferred embodiment of the invention, the following steps are advantageously taken. Positioning is initiated always when the cell identifier changes. At that stage when the positioning indicates that the device 1 is in the vicinity of a position condition determined for a predetermined function, positioning is repeated at intervals, until the device 1 is positioned sufficiently close to the location according to the position condition of the function, or has moved further away from said location.

When this embodiment is applied in connection with the second preferred embodiment of the invention, the following steps are advantageously taken. Positioning is not started immediately when the cell identifier changes, but the cell identifier is also compared with the stored cell identifiers. Thus, positioning and its repetition are not initiated until the device 1 has arrived to the area of such a cell in which the location according to a function is situated.

The device 1 does not necessarily move towards the location according to the position condition, but starts to move further away from the same. In such a situation the repetition of the positioning advantageously ceases and a shift to the act of examining the changing of the cell identifier takes place. The receding can be detected either on the basis of the determined location of the device 1 and the distance between the position condition or on the basis of the changing of the cell identifier.

In this preferred embodiment it is possible to determine a constant repetition interval of positioning or such a repetition interval that when the device moves closer to a location according to the position condition, the performance interval of positioning is shortened, and correspondingly, when the device 1 diverges from the location according to the position condition, the positioning interval is extended.

As was mentioned above, the cell identifier is only one of the properties of the wireless communication network, changing of which can be utilized in the present invention to estimate the necessity of positioning. Other such properties relating to the wireless communication network that can be monitored in the device 1 are for example the signal strength of the base station or base stations and information relating to the timing of signals (for example TA, Timing Advance). Thus, in a preferred embodiment of the invention, it is possible to reduce the need for positioning in the following manner. A signal-dependent coefficient of the serving base station, such as signal strength, is measured at intervals in the receiver 1.3 of the device 1. If the signal strength does not change significantly during successive measurements, it can be assumed that the device 1 has hardly moved, and it is not necessary to perform positioning. However, if the signal strength changes, irrespective of that whether the cell identifier has changed or not, it can be assumed that the device 1 has moved. Thus, it is possible to conduct positioning. On the other hand, the measurement of the signal strength can be restricted to be used only in the area of such a cell to which a location-based function relates. Thus, the device 1 monitors the changing of the cell identifier as presented earlier in this description. Only at that stage when the device 1 is in the area of such a cell to which a location-based function relates, the results of a signal strength measurement, a signal timing measurement or the like are utilized to estimate whether the device 1 has moved significantly, and whether it is necessary to conduct new positioning.

Furthermore, it is possible to determine a threshold value, which must be exceeded by the change before the positioning is started. Thus, small and possibly short-time alterations in the monitored property do not cause unnecessary positioning.

In some cases, when the device 1 moves especially further away from the base stations 2.1, the serving base station may change relatively often. In such a situation the changing may occur in such a manner that for example two or three serving base stations alternate, depending for example on the signal conditions and terrain obstacles between the base stations 2.1 in question and the device 1. In a method according to a preferred embodiment of the invention, it is examined in connection with the changing of the cell identifier, whether said serving base station has been a serving base station already a moment before. If this is the case, it can be decided that positioning is not necessary, because it is likely that the device 1 has not moved closer to a location according to a position condition of any reminder. In connection with the change, it is also possible to examine how long a time has passed from the preceding occasion when the base station functioned as a serving base station for said device 1. If a period of time shorter than the determined time limit has passed, it is possible to make a decision that positioning is not necessary. Similarly, if a period of time longer than the predetermined time limit has passed, positioning is conducted.

When the method according to a first preferred embodiment of the invention is applied, it is possible to perform the functions in the device 1, to a great extent preferably in the application software of the processor 1.2. Thus, alterations are not necessary in the communication network 2. When the method according to the second preferred embodiment of the invention is applied, it is possible to determine the cells in the communication network 2, from which the information is transmitted to the device 1. Thus, changes are necessary in the functions of the communication network 2 and in the device 1. It is, however, obvious that the actual positioning can be implemented in a manner known as such either solely in the device 1 or as a co-operation of the device 1 and the communication network 2. Thus, the device 1 transmits information on the received signals used in the positioning (for example information on the reception times of the signals), wherein functions requiring calculations are implemented in the communication network 2, for example in the network centre 2.3.

Although the invention is described hereinabove primarily in connection with the act of presenting reminders, it is obvious that the present invention can also be applied for activating and performing other functions. By means of the method according to the invention it is for example possible to activate an application (program) installed in the device 1 at that stage when the device 1 is positioned close to a predetermined location. Further examples of such applications that can be mentioned are call set-up, sending a text message to indicate for example that the user has arrived to a certain location, activating a map application, etc.

The invention is not restricted solely to the act of monitoring the changing of the serving cell, but the invention can also be applied in such a manner that the device 1 listens to signals transmitted by different base stations. Thus, if a new cell identifier is detected in the device 1, irrespective of that whether the serving base station has changed or not, positioning is conducted. Also in a situation in which the device 1 does not hear a base station that was heard a while ago, it can be determined that the device 1 has moved, and positioning is conducted.

Instead of the cell identifier it is possible to use another identifier that is dependent on the location to a certain extent. For example in a GSM cellular network it is possible to use a location area code LAC. The base station must also be understood widely to comprise the connection points of the communication network via which the communication network 2 communicates with the devices 1 in a wireless manner. In some systems such connection points are called access points.

In connection with the present invention it is in some applications also possible to utilize information on the distance of the device 1 to a location determined for a location-based function. For example on the basis of the location complying with the positioning conducted in the device 1, the distances to different location determinations are calculated and the distances are compared to the estimated maximum size of the cells. If the distance is significantly larger than the maximum size of the cell, it is not absolutely necessary to conduct the positioning next time the serving cell changes, but only after the serving cell changes several times. If the maximum size of the cell is for example approximately 70 km, and the distance of the device 1 from the target is for example in the order of 150 km, it can be assumed that the device 1 must travel in its entirety at least through one cell before the device 1 is close to the target. Instead of the size of the cell, or in addition to the same it is possible to estimate the (maximum) travel speed of the device 1 and to determine an estimate as to how long it will take for the device 1 to move into the vicinity of the target. Thus, positioning is not absolutely necessary before a set time has passed from the previous positioning.

The invention can also be applied in such a manner that a message indicating that the device 1 has arrived to a certain location (or area) is transmitted to another device. The data of the location-based function are thus preferably stored in a communication network 2 in which the processing of the information is conducted. Thus, the device 1 primarily performs positioning functions according to the embodiments presented above in situations where the cell identifier changes. Yet another embodiment that can be mentioned is that the arrival of several devices to a certain location or area is monitored, wherein the function is performed in a device at that stage when predetermined devices or a predetermined number of devices to be monitored have arrived in the vicinity of a determined location. This arrangement can be used for example in a meeting of several people. The user of the device that has presented the message can set up a meeting after having noticed the message, for example by calling the persons that are in the vicinity of a predetermined location.

It will be evident to those of skill in the art that the present invention is not limited solely to the above-presented embodiments but it can be modified within the scope of the appended claims.

The invention claimed is:

1. A method for a mobile device to provide a location-based function, comprising:
   monitoring at least one property of a wireless communication network,
   determining whether to conduct a positioning of the device based on the at least one property of the wireless communication network,
   conducting the positioning to determine the position of the device, and
   determining whether to activate the location based on at least one item of position data of the device,
   wherein the at least one property comprises a signal strength of a base station of said wireless communication network, said signal strength is measured at intervals, and at least information on changes in the signal strength is utilized in determining whether to conduct the positioning, and wherein whether the device is in an area of a cell to which the location based function is connected is determined by a cell identifier, and information on the base station signal strength is used for determining whether to conduct the positioning only when the device is in the area of the cell identified by said cell identifier.

2. The method according to claim 1, wherein said location based function is an act of presenting a message.

3. The method according to claim 1, wherein said location based function is activated when the determined position of the device corresponds with at least one item of position data for the function.

4. A system comprising
   a device and
   a wireless communication network element, wherein the wireless communication network element comprises at least one transmitter for transmission of signals, and the device comprises:
   a unit for monitoring at least one property of the wireless communication network,
   a unit for determining whether a positioning of the device should be conducted based on said at least one property of the wireless communication network,
   a positioning element for determining a location of the device, and
   a processor for managing a location-based function, in which whether to activate the location based function is determined based on at least one the item of position data of the device, wherein the least one property comprises a signal strength of a base station of said wireless communication network, said signal is measured at intervals, and at least information on changes in the signal strength is utilized in determining whether to conduct the positioning, and wherein whether the device is in an area of a cell to which the location based function is connected is determined by a cell identifier, and information on the base station signal strength is used for determining whether to conduct the positioning only when the device is in the area of the cell identified by said cell identifier.

5. The system according to claim 4, wherein the unit for monitoring at least one property comprises measurement means for measuring the signal strength of at least two signals received from the base station, and wherein the at least information on a change of the signal strength is used in the determination unit for determining whether the positioning of the device should be conducted.

6. A device for providing a location-based function, in which at least one item of position data of the device is used as a condition for activating the function, said device comprising:
   means for setting up a data network connection to a wirless communication network element comprising at least one transmitter for transmission of signals,
   means for monitoring at least one property of the communication network, means for determining whether to conduct a positioning of the device based on the at least one property of the communication network, means for conducting the positioning to determine the position of the device, and means for determining whether to activate the location based function based on at least one item of position data of the device, wherein the at least one property comprises a signal strength of a base station of said wireless communication network, said signal strength is measured at intervals, and at least information on changes in the signal strength is utilized in determining whether to conduct the positioning, and wherein whether the device is in an area of a cell to which the location based function is connected is determined by a cell identifier, and information on the base station signal strength is used for determining whether to conduct the positioning only when the device is in the area of the cell identified by said cell identifier.

7. A program stored on a machine-readable medium for use in a mobile device, comprising:

instructions for monitoring at least one property of a wireless communication network, instructions for determining whether to conduct a positioning of the device based on the at least one property of the wireless communication network, instructions for conducting the positioning to determine the position of the device, and instructions for determining whether to activate the location based function based on at least one item of position data of the device, wherein the at least one property comprises a signal strength of a base station of said wireless communication network, said signal strength is measured at intervals, and at least information on changes in the signal strength is utilized in determining whether to conduct the positioning, and wherein whether the device is in an area of a cell to which the location based function is connected is determined by a cell identifier, and information on changes in the base station signal strength is used for determining whether to conduct the positioning only when the device is in the area of the cell identified by said cell identifier.

8. A device comprising:

a location-based function, in which at least one item of position data is determined for the function as a condition for activating the function, a processor for activating the location-based function in the device according to the condition, a wireless communicating unit in communication with a wireless communication network element comprising at least one transmitter for transmission of signals, a monitor for monitoring at least one property of the wireless communication network, a determination element for determining whether a positioning of the device is to be conducted based on the monitored property, and a positioning element for determining the location of the device, wherein the at least one property comprises a signal strength of a base station of said wireless communication network, said signal strength is measured at intervals, and at least information on changes in the signal strength is utilized in determining whether to conduct the positioning, and wherein whether the device is in an area of a cell to which the location based function is connected is determined by a cell identifier, and information on the base station signal strength is used for determining whether to conduct the positioning only when the device is in the area of the cell identified by said cell identifier.

9. The device according to claim 8, wherein it is a wireless communication device.

* * * * *

UNITED STATES PATENT AND TRADEMARK OFFICE
CERTIFICATE OF CORRECTION

PATENT NO. : 7,305,244 B2
APPLICATION NO. : 10/762589
DATED : December 4, 2007
INVENTOR(S) : Blomqvist et al.

Page 1 of 1

It is certified that error appears in the above-identified patent and that said Letters Patent is hereby corrected as shown below:

In column 10, line 3, claim 1, line 10 after "based" --function-- should be inserted.

In column 10, line 39, claim 4, line 16 "the" should be deleted.

In column 10, line 42, claim 4, line 19 after "signal" --strength-- should be inserted.

Signed and Sealed this

Seventeenth Day of June, 2008

JON W. DUDAS
*Director of the United States Patent and Trademark Office*